A. L. MURRAY.
REINFORCEMENT FOR PNEUMATIC TIRES.
APPLICATION FILED JUNE 28, 1909.

946,557. Patented Jan. 18, 1910.

Witnesses
F. L. Stewart
C. E. Blakeslee

Inventor
Albert Linn Murray
By
Ithiel J. Cilley
Attorney

UNITED STATES PATENT OFFICE.

ALBERT LINN MURRAY, OF GRAND RAPIDS, MICHIGAN.

REINFORCEMENT FOR PNEUMATIC TIRES.

946,557.  Specification of Letters Patent.  Patented Jan. 18, 1910.

Application filed June 28, 1909. Serial No. 504,907.

*To all whom it may concern:*

Be it known that I, ALBERT LINN MURRAY, a citizen of the United States, residing at Grand Rapids, in the county of Kent and State of Michigan, have invented certain new and useful Improvements in Reinforcements for Pneumatic Tires, of which the following is a specification.

My invention relates to improvements in pneumatic tires for use upon automobiles and kindred vehicles, and more particularly for use with so called "inner tube" tires, and its objects are: First, to provide a reinforcement to be placed between the inner tube and the casing of a pneumatic tire in such a manner that the inner tube will be fully protected from injury from any puncturing object that may be forced through the casing. Second, to provide a reinforcement of the class stated that is so constructed that it will be automatically adjusted to the size and contour of the casing. Third, to provide a reinforcing element in pneumatic tires that will allow of the easy and convenient insertion of the inner tube. Fourth, to so arrange the fabric portion of the reinforcing tube as to raise its powers of resistance to the highest efficiency. I attain these objects by the mechanism illustrated in the accompanying drawing, in which—

Figure 1:
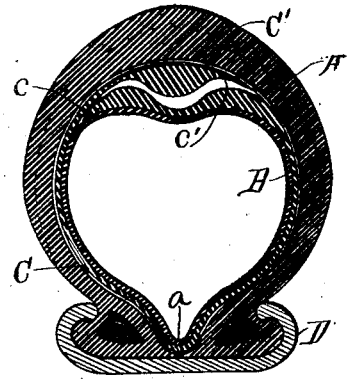
Figure 2:
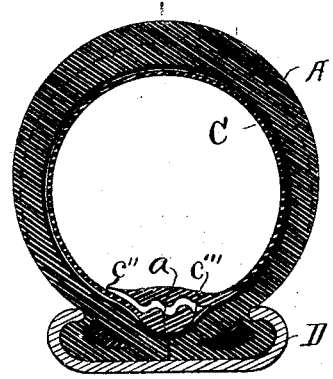

Figure 1 is a cross section of a tire showing the reinforcing portion open and overlapping at the tread of the tire, and with the inner tube in place. Fig. 2 is a modified form of the same with the overlapping portion of the reinforcement at the base of the tire, and Fig. 3 indicates the manner of laying up the fabric for strengthening the reinforcing element.

Similar letters and figures of reference refer to similar parts throughout the several views.

This reinforcement is designed for use, preferably, with clencher casings and is made open longitudinally the entire length of the reinforcing tube C. With an ordinary clencher tire, the inner tube B is likely to become clamped between the meeting edges, $a$, of the casing A with the result that its expansible qualities are thereby greatly restricted, and it is liable to become punctured either at this line by reason of the extremely heavy pressure between these edges, or by reason of too great pressure within the tube without the supporting surface of the casing, prevented by reason of a sufficient amount of the inner tube being clamped between the edges $a$ to prevent it from stretching sufficiently to fill the casing properly. To avert this danger I place a reinforcing tube C inside of the casing A. This tube is left open the entire length of either the outer or the inner periphery, as indicated at $c\ c'$ in Figs. 1 and $c''$, $c'''$ of Fig. 2, so that the inner tube B may be readily inserted. I make the overlapping ends or edges of this reinforcing tube much thicker than the balance, and serrate or form alternating interlocking ribs, so arranged that when the inner tube B is inflated these surfaces will become interlocked in such a manner that it will be impossible for them to slip laterally, to any extent, yet so arranged that they will adjust themselves sufficiently to meet the full required expansion of the inner tube B and form a perfect bearing over the entire inner surface of the casing.

Figure 3:
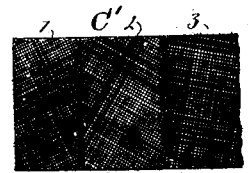

I prefer that the reinforcing tube C be made up with strong fabric layers, as indicated at C', strengthened and well planted in rubber, in the usual manner of making tire casings, and for this purpose I make the fabric reinforcement of two or more layers of fabric, as 1, 2, 3, in Fig. 3. I prefer the use of three plies or layers of fabric, as indicated in Fig. 3, for this purpose, and so arrange the layers that the warp and woof of each will be upon a different angle from the others as, for instance, in Fig. 3 I have shown the fabric at 1 cut so that the downwardly angling warp inclining to the right, stands at an angle of about 30 degrees from the perpendicular while at 2 the incline shows about forty five degrees from the perpendicular, and at 3 the angle would indicate about sixty degrees from the perpendicular, which so distributes the incline of the warp and woof of the layers that the threads will be so crossed and intercrossed that it will be impossible for any puncturing article to pass through them without cutting several threads in one or more of the layers. This is especially sure when these fabric layers have been thoroughly impregnated with, and are firmly supported by the rubber that forms the important element in the construction of these reinforcing elements. These reinforcing tubes may be cut in short lengths, if desired, and used to cover short distances immediately adjacent to a puncture, which would render them very efficient for temporary use in closing difficult punctures when one has no repair kit at hand with which to remove the inner tube and place the entire reinforcing tube in the case.

For new work where the reinforcing tube C and the inner tube B are inserted before the tire is placed upon the rim D, I prefer the use of the reinforcing tube shown in Fig. 1 as it greatly strengthens the tire at the tread, where punctures are most liable to occur, but for repair work, especially upon the road where the needed implements for this line of repair are not at hand, I prefer the form shown in Fig. 2 as it is much more convenient to enter this form, especially when short pieces are used for temporary repairs, as intimated earlier in the specifications.

By "clencher tires," hereinbefore mentioned, is meant any tire that is opened the entire length of the inner periphery for the ready insertion of an inner tube, whether the tire casing is secured to the rim D by the ordinary clencher formation, or by bolts, retaining wires or otherwise.

The overlapping edges of the reinforcing tube C should be so constructed that they will render or slide upon each other when light pressure is exercised upon them during the inflation of the inner tube, but will become immovable when heavy pressure is produced, as when the inner tube is fully inflated, and this may be brought about by the use of the formations shown, and particularly that shown in Fig. 1, without any other element, or a proper cement may be used if desired.

What I claim as new, and desire to secure by Letters Patent of the United States, is:

1. In combination with the casing and the inner tube of a pneumatic tire, an intermediate tube opened and overlapped along the entire length of its periphery, said overlapping portions made to interlock to form, under pressure, an air tight connection, and several thicknesses of reinforcing fabric having the warp and woof at various angles and fully impregnated with and made a part of the material of which the tube is made.

2. In combination with the casing and inner tube of a pneumatic tire, a reinforcing tube having a peripheral opening its entire length, overlapping surfaces along the line of said opening, interlocking serrations upon said overlapping surfaces, and a reinforcing element in said tube consisting of several layers of fabric cut and placed so that the warp and woof of each layer will be at a different angle from those in the others and all the layers fully impregnated with the rubber element of the tube.

Signed at Grand Rapids Michigan June 26, 1909.

ALBERT LINN MURRAY.

In presence of—
T. L. STEWART,
I. J. CILLEY.